Nov. 11, 1969  W. B. TINSLEY  3,477,748
SWIVEL JOINT FOR WELLS BEING PUMPED
Filed Dec. 9, 1968

William B. Tinsley
INVENTOR.

BY
ATTORNEY

United States Patent Office 3,477,748
Patented Nov. 11, 1969

3,477,748
SWIVEL JOINT FOR WELLS BEING PUMPED
William B. Tinsley, 1926 Colony Drive,
Irving, Tex. 75060
Filed Dec. 9, 1968, Ser. No. 782,099
Int. Cl. F16l 27/04
U.S. Cl. 285—267          1 Claim

ABSTRACT OF THE DISCLOSURE

A swivel joint for use on wells having pumped production, said joint having a male and female member and being connected by yieldable means therebetween, to permit the female member a rocking motion with the reciprocation of the pumping jack, and having novel yieldably mounted means for sealing the male and female members against high pressure leakage.

Background of the invention

This invention is an improvement over the patent issued to applicant in July of 1931, being Patent No. 1,917,742. The invention described in said patent having the objection of being of little use where high pressures are encountered in the well tubing.

Summary of the invention

A swivel joint for wells producing by pump, having a male and female member, a stuffing box above said female member and spring loaded bolts connecting said male and female member, with an annular groove in the face of the male member and an annular gasket mounted in said groove, said gasket being yieldably urged against the face of the female member and having its abutting end face formed to match the arcuate conformation of the abutting face of the female member.

Description of the preferred embodiment

Figure 1:
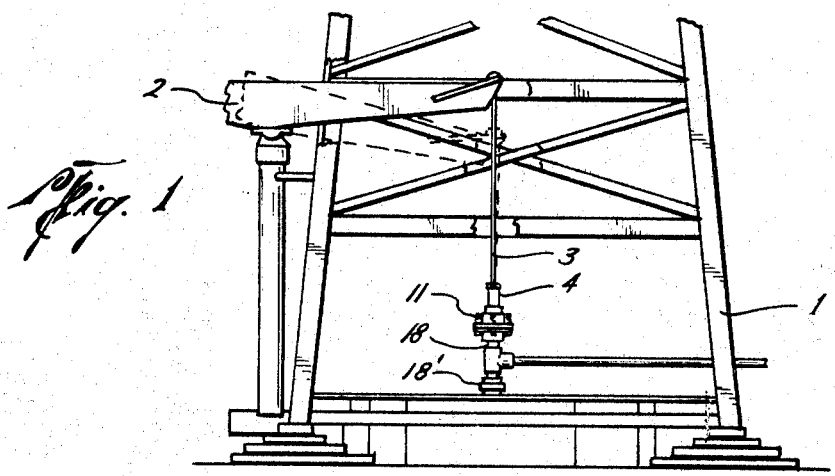
FIGURE 1 is a side elevational view of the joint mounted on a well head.
Figure 2:
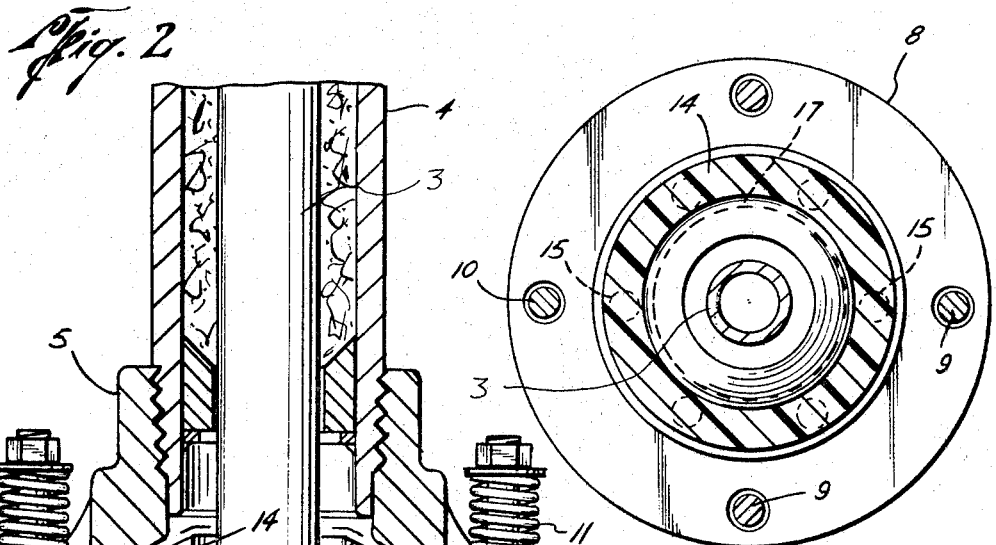
FIGURE 2 is an enlarged side elevational view of the device.
Figure 3:
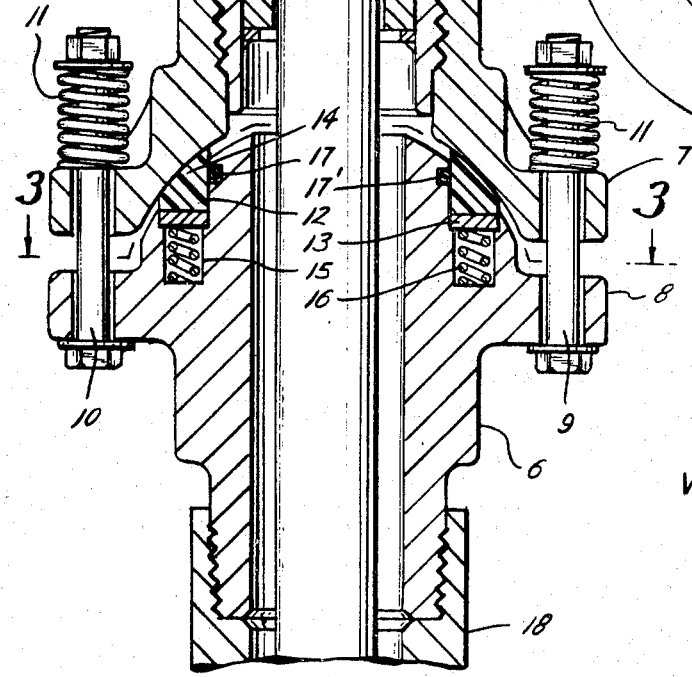
FIGURE 3 is an end view, in cross section, taken on the line 3—3 of FIGURE 1.

In the drawings, the numeral 1 designates a well derrick in which is mounted the walking beam 2 on the extended end of which is secured the string of sucker rods 3, which pass through the stuffing box 4. The female member 5 of the joint is connected to the bottom end of the stuffing box 4, in the usual manner, and has the lower portion thereof formed into an arcuate socket to receive the ball end of the male member 6. The members 5 and 6 have the external outwardly projecting flanges 7, 8 in vertical alignment, in which are mounted the bolts 9, 10, suitable bolt holes being provided in said flanges, said bolts having yieldable means, such as the springs 11, 11, mounted thereon to permit the member 5 to rock with the movement of the walking beam 2.

On the face of the male member 6, adapted to abut the socket of the female member 5, is an annular groove 12, adapted to receive the annular plate 13 and the flexible packing member 14. The flexible member 14 is designed to seal and wear, and is preferably formed of Teflon, or similar material, and a plurality of chambers 15, 15 are formed in the bottom of the groove 12 in which yieldable members, such as the springs 16, 16 are inserted, having one end bearing against said plates 13 to apply upward pressure thereto. The packing member 14 has its extended end shaped to conform to the contour of the inside surface of the socket of the female member 5, and a groove 17 is formed in the inside wall of the groove 12 in which an O-ring 17' is mounted.

In operation the walking beam 2 moves up and down, moving the sucker rods 3 through the stuffing box 4, and members 5, 6, and the well head 18' into the well tubing 18. As the walking beam 2 reciprocates, the horizontal movement of the sucker rod string above the well head will be absorbed by the yieldable connection maintaining the member 5 on the member 6, and the flexible packing member 14 will be maintained in close contact with the face of the socket of the female member 5, sealing the joint against leakage where high pressures in the tubing 18 are encountered, the yieldable means 15 permitting the packing 14 to move with the movement of the member 5 without effecting the compression on the packing 14, which maintains the desired seal, and the plate 13 maintaining this pressure evenly over the area of the packing 14.

What I claim is:

1. In a swivel joint for well heads, a male and a female tubular member, external peripheral flanges on said members having aligned bolt holes formed therein, bolts extending through said bolt holes in said flanges and yieldable means mounted on said bolts to maintain said members yieldably in connected relation, a stuffing box on the upper end of said female member and an annular groove in the abutting face of said male member, packing means yieldably mounted in said groove and extending outwardly therefrom and maintaining sealing contact with the abutting face of said female member, said groove in said male member has an annular groove in the side wall thereof and a flexible O-ring mounted in said groove and bearing against the side of said packing.

References Cited

UNITED STATES PATENTS

| 1,373,515 | 4/1921 | Loomis | 285—267 X |
| 1,532,195 | 4/1925 | Morrison | 285—267 |
| 1,917,742 | 7/1933 | Tinsley | 285—268 |
| 2,041,316 | 5/1936 | Bennett | 285—166 X |
| 3,142,344 | 7/1964 | Otteman et al. | 285—223 X |
| 3,188,115 | 6/1965 | Morrish, et al. | 285—368 X |

DAVID J. WILLIAMOWSKY, Primary Examiner

DAVE W. AROLA, Assistant Examiner

U.S. Cl. X.R.

285—268